United States Patent Office 2,935,498
Patented May 3, 1960

2,935,498

POLYMERIZATION OF α-OLEFINS TO SOLID POLYMERS WITH A THREE-COMPONENT CATALYST

Hugh J. Hagemeyer, Jr., and Marvin B. Edwards, Longview, Tex., assignors to Eastman Kodak Company, Rochester, N.Y., a corporation of New Jersey No Drawing. Application July 1, 1957
Serial No. 668,924

9 Claims. (Cl. 260—93.7)

This invention relates to an improved process for forming solid polymers of normally gaseous α-mono-olefinic hydrocarbons. In a particular aspect, this invention relates to a process for the catalytic polymerization of α-mono-olefinic hydrocarbons using a novel catalyst for the reaction.

For many years olefins were polymerized to low molecular weight liquid hydrocarbons by catalytic procedures. These processes normally employed pressures below 200 atmospheres during the polymerization. It was then discovered that with the use of extremely high pressures of the order of 500 atmospheres and higher, the very short chain olefinic hydrocarbons, such as ethylene, could be polymerized to produce solid polymers. This high pressure solid polyethylene has, of course, found great utility in a variety of commercial applications. It is flexible and relatively low melting but forms excellent sheets and films wherein a high degree of strength is not required.

More recently, it has been found that α-mono-olefinic hydrocarbons, such as ethylene and propylene, can be catalytically polymerized with certain specific catalyst combinations to produce high molecular weight polyolefins having unusually high crystallinity and density. Thus, polyethylene produced by a catalytic process was found to be considerably stiffer than polyethylene produced by the previously employed high pressure procedures.

One general type of catalytic process which has received considerable attention involved the use of certain metal oxides, preferably spread on a solid support, for polymerizing the gaseous olefins to solid polymers. The best known processes of this kind are the Standard Oil process typified by U.S. Patent 2,691,647 and the Phillips process typified by Belgian Patent 530,617.

In the Phillips process chromium oxide on silica alumina formed the polymerization catalyst. It was usually necessary to employ special activation techniques for the catalyst and support in order to achieve the requisite degree of catalytic activity. Thus, it was necessary that at least a portion of the catalyst consist of hexavalent chromium, and the activity of the catalysts varied greatly with changes in the proportions of the silica to the alumina and with the activation procedure. In the Phillips process it was shown that molybdenum oxide in the hexavalent state was completely ineffective for forming solid polymer even at pressures of the order of 600 to 1000 p.s.i. ordinarily employed in the Phillips process.

In contrast to this, the Standard Oil process involved the use of an oxide of chromium, molybdenum, tungsten or uranium but it was necessary to employ the metal oxide in combination with an alkali metal or in a particular state of reduction. Thus, the catalyst ordinarily was reduced partially to give an average valence lower than 6. In the case of an oxide, such as molybdenum oxide, this lowered valence state was necessary for activity in the absence of an alkali metal promoter.

Both of the above-mentioned previously known procedures thus depended upon specific activation methods for achieving optimum catalytic activity. It is an object of this invention to provide a novel and improved procedure for producing solid polyolefins from normally gaseous α-mono-olefinic hydrocarbons. It is another object of this invention to provide a novel and improved process for producing solid polyolefins using novel catalysts for the reactions that result in more rapid polymerization rates. It is another object of this invention to provide a novel and improved process for producing solid polyolefins using metal oxide catalysts activated with unique activators. It is another object of this invention to provide catalysts for the polymerization of polyolefins that are safe, cheap, and readily available, and the catalysts undergo no violent reaction with either water or air. Hence, no special precautions are needed in handling the catalytic material. It is a further object of this invention to provide a novel procedure for producing polyolefins wherein close control of the crystallinity of the polymer is possible. It is still a further object of this invention to provide a novel process for producing polyolefins of superior color characteristics.

These and other objects of this invention are attained by producing polyolefins in accordance with this invention wherein α-mono-olefinic hydrocarbons containing from 2 to 10 carbon atoms are contacted with a catalyst comprising an oxide of a metal from groups V and VI of the periodic table activated with a metal from groups II and III and a halide of a metal from groups II and III. Thus, we have found that normally gaseous α-mono-olefinic hydrocarbons containing from 2 to 10 carbon atoms, either singly or in admixture, can be readily polymerized to form high density, highly crystalline, solid polymers by using the catalysts of this invention. Although the process embodying the invention can be carried out batchwise in the usual pressure reactor or autoclave, the invention is particularly applicable for preparing polyolefins in a continuous process wherein a solution of the olefin being polymerized together with the catalyst combination is reacted at a temperature within the range of 100 to 260° C. and an elevated perssure within the range of 200 to 2000 p.s.i. The exact mechanism by which the catalyst mixture catalyzes the polymerization reaction is not known, although the various components of the catalyst contribute in large measure to the unexpectedly good results that are obtained.

The polymerization reaction in accordance with this invention proceeds readily at temperatures within the range of 100 to 260° C. and at pressures ranging from slightly above atmospheric pressure to very high pressures. It is usually desirable in the continuous procedures preferred for commercial operation to employ a liquid reaction vehicle in which the polymer being produced is soluble at elevated temperatures but relatively insoluble at room temperature. In this way it is possible to carry out the polymerization process at a temperature at which the product formed remains dissolved in the liquid reaction vehicle and then can be separated out by allowing the reaction medium to cool. The catalyst combination used in practicing this invention not only makes the activation of the catalyst components unnecessary but also provides a process wherein the supported catalyst can be used for greatly extended periods of time without plugging and without the necessity of being withdrawn from the reactor for regeneration or reactivation.

The liquid reaction vehicles that can be employed in practicing our invention are usually inert organic normally liquid compounds. The liquid vehicles are preferably inert hydrocarbons such as the alkanes as typified by pentane, hexane and heptane and the like, cycloalkanes, such as cyclohexane, aromatic solvents, such as benzene, toluene, the xylenes, naphthalenes and the like, as well as such derivatives as chlorobenzene, chloronaphthalene and the like. The ketones, alcohols and similar oxygenated compounds are not particularly good solvents for the polyolefins and, hence, they are employed primarily to reduce the solubility of the polymer in the reaction medium rather than as the reaction vehicle itself.

The catalyst contains an oxide of a metal from groups V and VI of the periodic table. The metal oxide can be used in the pure state but improved reaction rates are obtained when the metal oxide is extended upon an inert support. We have found that it is possible to employ a slurry type process using 20 to 200 mesh size particles of 0.1 to 10% by weight of an oxide of vanadium, chromium, molybdenum or tungsten distributed on a suitable support such as alumina, silica or a mixture containing 90% silica and 10% alumina. There is evidence to indicate that the silica-containing support enhances the catalytic activity tof he metal oxide by formation of a complex. This effect is most pronounced when oxides of chromium or vanadium are used as catalysts. The invention can be practiced with a fixed bed of catalyst using larger catalytic particles and forcing a solution of olefin in a suitably chosen solvent over the bed of catalyst. When supported catalysts are used, the content of the group V or VI metal oxide is usually within the range of 0.1 to 10% by weight of the catalyst. Larger amounts of the metal oxide can be used but there is no indication that larger amounts are necessary in order to obtain any improvement in catalytic activity.

The valence state of the group V or VI metal in the catalyst is not known. However, it is known that it is preferable to introduce the metal oxide in a valence state somewhat below the maximum possible since this minimizes the amount of oxygen introduced into the reaction zone. Reduction of the metal oxide catalyst can be accomplished at high temperatures (300 to 800° C.) with hydrogen gas or by contact with hydrocarbons at these temperatures. Frequently a thermal reduction of the metal oxide is sufficient and this procedure is most frequently used. It is necessary to protect the reduced metal oxide from air during cooling, transferring and storage.

A satisfactory procedure for producing a supported catalyst that can be used in practicing this invention involves deposition from an aqueous solution of an oxide, nitrate or an ammonium derivative of the metal onto the supporting material. The deposited catalyst can then be dried at temperatures up to 350° C. or higher to form a layer of the desired oxide on the support. Any of the well-known alumina-containing supports can be used including gamma-alumina, any of the various silica-aluminas, activated clays, bauxite or similar alumina-containing materials. The supported catalyst can be used in the form of powder or pellets depending upon the type of reaction to be used. The use of pellets of approximately ⅛-inch size has proven to be eminently satisfactory particularly in continuous flowing stream procedures since this catalyst does not tend to wash out of the system in the flowing stream.

Activation of the metal oxide catalyst is brought about in accordance with this invention by the presence in the reaction medium of a metal from groups II and III of the periodic table and a halide of a metal from groups II and III. The metal is advantageously introduced to the reaction medium in the form of a finely divided powder. Examples of the metals that can be used are aluminum, zinc and magnesium. The group II or group III metal halide is generally a chloride or bromide of aluminum, zinc or magnesium. The preferred catalyst activator is a combination of aluminum and aluminum chloride.

The concentration of catalyst in the reaction medium can vary within rather wide limits. We have used concentrations in the range of 0.004% to 1.5% by weight (based on the metal oxide) but higher and lower concentrations of catalyst can be used. The highest yields of polymer per unit weight of catalyst are obtained at high solvent to catalyst ratios. When low solvent to catalyst ratios are used, the catalyst quickly becomes covered with polymer because the ability of the solvent to remove the polymer from the surface of the catalyst is limited at high polymer concentrations. The mole ratio of group II or III metal or group II or III metal halide to the metal oxide is also subject to considerable variation. The mole ratio in general of the metal to the metal oxide is held within the range of 1:1 to 200:1. The quantity of metal halide that is fed to the reactor is based on the amount of metal employed. Usually from 0.5 to 2.0 moles of metal halide are employed per atom of metal. In general, the polymerization rate or catalyst activity of a particular catalyst system within the scope of our invention increases as the ratio of metal and metal halide to metal oxide increases. The degree of crystallinity of the product is more dependent on the ratio of metal to metal halide than upon the other components of the catalyst. With aluminum and aluminum chloride, for example, an excess of aluminum chloride over the aluminum metal usually leads to the formation of highly amorphous polymeric products of low crystallinity. When high ratios of aluminum chloride to aluminum are used, it is desirable to employ the lower reaction temperatures in order to obtain a satisfactory amount of solid polymer. At higher reaction temperatures, lower ratios of aluminum chloride to aluminum are preferable. When excess aluminum is used, the catalyst tends to produce a highly crystalline polymer containing little, if any, amorphous product.

Generally, the polymerization reaction is carried out at a temperature within the range of 100 to 260° C. The actual temperature that is used has a pronounced effect upon the rate of polymerization and also upon the nature of the polymer that is produced. Higher temperatures result in faster polymerization rates and produce a polymer of low molecular weight and low crystallinity. On the other hand, the lower temperatures tend to produce polymeric products of high molecular weight and high crystallinity. Some of the examples appearing hereinafter demonstrate the effect of using a high polymerization temperature along with an excess of aluminum halide compared with the amount of aluminum employed.

The invention can be employed for polymerizing any of the normally gaseous olefins, and particularly those containing 2–10 carbon atoms such as 1-pentene, 1-hexene, 1-decene, and the like, and is particularly applicable for polymerizing ethylene, propylene and mixtures thereof. The polymers prepared in accordance with the invention have molecular weights greater than 1000 and usually greater than 10,000. Molecular weights even above 1,000,000 can be readily attained by means of this process as defined. The poly-α-olefins obtained from ethylene or propylene have softening or fusion points above 130° C. The polyethylenes are insoluble in solvents at ordinary temperatures but are partially soluble in such solvents as xylene, toluene or tetralin at temperatures of about 100° C. With the exception of compounds of extremely high molecular weight, the polyethylenes obtained according to this invention are soluble in tetralin at 145° C. The polyethylenes embodying the invention are characterized by high crystallinity, generally higher than about 80% as shown by X-ray diagrams. In fact, the crystallinities of most polyethylenes obtained by this process average close to 90%, and the number of methyl groups per hundred carbon atoms is usually of the order of 0.5 or lower. This low degree of chain branching results in densities much higher than are achieved with high pressure polyethylenes, densities of 0.945 or higher being commonly obtained. The inherent viscosity of the various polyethylenes hereby obtained, as measured in tetralin at 145° C. can be varied from about 0.5 or lower to 5.0 or higher. Melt indices as measured by the standard ASTM method can also be varied from about 0.01 to 100 or even higher.

As an example, polyethylene prepared by this process and having a molecular weight in the range of 50,000 will have a density in excess of 0.945, a softening temperature of at least 130° C., a tensile strength of 3000 to 5500 p.s.i., and a stiffness in flexure at 5% deflection (ASTM Test D747-50) of at least 50,000 p.s.i. The polymers embodying the invention can be formed into flexible plates or films between heated plates or by extrusion through a suitable die. The products combine stiffness and high softening point and hence can be employed in many applications wherein the usual high pressure polyethylene does not possess the requisite properties. The polymers can be extruded in the form of pipe or tubing, injection molded into a great variety of articles, or cold drawn into ribbons, bands, fibers or filaments of high elasticity and rigidity. Fibers of high strength can be readily spun from the molten polyethylene according to this process.

The monomer being charged to the polymerization process is preferably substantially pure, although the ethylene or propylene or the like monomers may contain varying amounts of hydrogen or hydrocarbons such as methane, ethane, propane or the like. In the case of the preparation of copolymers, of course, the charging stock will consist of a mixture of monomers in the desired proportions. Since the pressures employed might only be sufficient to maintain the reaction mixture in liquid form under the polymerization conditions, the pressure is readily obtained by joining the reaction system to a source of the gas being polymerized under pressure. The polymerization reaction will vary somewhat in speed depending upon the reaction conditions, concentrations, and similar variable factors. The contact time in the continuous process will usually be considerably less than in the batch reactions wherein the contact time will ordinarily run from about 1 to 24 hours, and usually from 1 to 4 hours. In the continuous processes, the reaction time may be varied from a few minutes to a few hours, with contact times of from one-half to one hour usually being sufficient. The concentration of monomer in the liquid reaction medium will usually be in the range of 2–25% by weight and preferably 2–10% by weight. At concentrations above about 10% by weight, the rate of polymerization increases, but the increased amount of polymer dissolved in the vehicle gives highly viscous solutions which are difficult to handle. The solvent to catalyst ratio can be varied over a wide range of from about 1 to about 3000 or higher for flowing stream continuous processes. Even with very high solvent ratios, the presence of the catalyst causes rapid polymerization during passage over the supported catalyst to give the desired products.

Among the outstanding advantages of the catalysts of our invention is the fact that in our process faster polymerization rates are achieved when compared with other similar polymerization procedures using metal oxide catalyst systems, e.g., the Standard Oil and Phillips processes. In batch polymerizations using our catalyst ethylene, polymerizations as high as 1250 grams of polymer per gram of metal oxide per hour have been produced. Such high polymerization rates are of considerable commercial importance. It is another feature of our process that close control of the crystallinity of the solid product polymer is possible by varying the relative proportions of metal and metal halide in the catalyst activator. Consequently, in our process it is possible to produce a variety of polymeric products whose properties are suitable and well adapted for a variety of predetermined uses. It is a further feature of our process that solid polymers of superior color characteristics are produced. The explanation of this phenomenon is not clear but it has been demonstrated that our polymeric products contain fewer color bodies than the products of polymerization processes using other activated metal oxide catalysts. As a result of this feature, the product of our process is easily purified, if any purification at all is required, and the purification procedure is less exacting and costly. In addition to the above features, it is important to recognize that the catalysts we use are safe and cheap and, consequently, easily handled. As a result, no special precautionary measures are required in the handling and use of these catalysts.

The following examples are illustrative of our invention:

Example 1

A one percent vanadia on gamma-alumina catalyst was prepared by dissolving ammonium meta-vanadate in water, slurrying 100-mesh gamma-alumina into the solution and drying at 120° C. The catalyst was activated just prior to use by heating in vacuo at 480° C. for 16 hours.

A 4.0 g. portion of the catalyst was weighed in a nitrogen atmosphere into 1000 ml. of iso-octane containing 1.00 g. (0.037 atom) of aluminum powder and 4.9 g. (0.037 mole) of aluminum chloride. The iso-octane was purified by refluxing 3000 parts of distilled iso-octane for 16 hours with 4 parts of calcium hydride and 10 parts of 10% $MoO_3$—$Al_2O_3$ catalyst (reduced at 480° C. for 16 hours with hydrogen) and then distilling through a 15-plate column.

The catalyst mixture was charged to a nitrogen-filled 2-liter stirred autoclave. Nitrogen in the autoclave was displaced with ethylene and the mixture was heated with stirring to 150° C. When the temperature reached 150° C., ethylene was admitted until the pressure amounted to 1320 p.s.i. Reaction was continued at 150° C. for 18 hours with fresh ethylene being added whenever the pressure fell to 800 p.s.i. Total pressure drop was 2750 p.s.i. The autoclave was cooled to room temperature and the polyethylene was removed as a solid plug adhering to the stirrer. The polymer was cut from the stirrer and dried in vacuo at 70–80° C. to constant weight. The crude polyethylene weighed 140 g.

A portion of the polymer was freed of catalyst by filtration of a 0.1% solution in xylene. Properties of the filtered polymer were:

| | |
|---|---|
| Melt index | 0.001 |
| Specific gravity | 0.946 |
| Tensile strength: | |
| At fracture | 4765 |
| At upper yield | 2475 |
| Percent elongation | 500 |
| Stiffness in flexure | 44,800 |

Example 2

A sample of the 1% $V_2O_5$ on gamma-$Al_2O_3$ catalyst used in Example 1 was activated by heating in an air stream at 500° C. for 2 hours. Four grams of the activated catalyst was weighed while still at 500° C. into 1000 ml. of heptane containing 1.0 g. (0.037 atom) of aluminum powder and 4.9 g. (0.037 mole) of aluminum chloride. The heptane used had been purified by refluxing 16 hours over calcium hydride followed by distillation.

The catalyst mixture was transferred into a 2-liter stirred autoclave under a blanket of nitrogen. Polymerization was carried out at an ethylene pressure of 900–600 p.s.i. and a temperature of 190° C. for 7 hours. After cooling to room temperature, the crude polymer was worked up by washing several times with methanol in a Waring Blendor. The crude polymer weighed 160 g. when completely dried.

Purification of the polyethylene was accomplished by filtration under 30–50 p.s.i. pressure of a 1 percent solution of the crude polymer in a 3:1 Stoddard solvent-xylene solution Melt index of the polymer was 0.001.

Example 3

A catalyst mixture prepared as described in Example 2 was contacted with ethylene at 1100–500 p.s.i. and at 230° C. for 7 hours. A pressure drop of 3100 p.s.i. took place. The polymer was recovered, dried and separated from catalyst residues as described for Example 2. The yield of polyethylene was 210 g.; melt index, 0.1.

The combined effect of polymerization temperature and mole ratio of group II or III metal to group II or III metal halide on the nature of the polymer is illustrated in Examples 4 and 5. In both cases the mole ratio of $AlCl_3$ to Al was 2:1. At 240° C. (Example 4) only liquid polymer was produced; at 150° C. (Example 5) polymer of melt index 0.038 was formed.

*Example 4*

A 2-liter stirred autoclave was charged with 1.0 g. (0.037 atom) of aluminum powder, 9.8 g. (0.074 mole) of aluminum chloride, 4.0 g. of 1% $V_2O_5$—$Al_2O_3$ catalyst, and 1000 ml. of mineral spirits. Mineral spirits is a sulfuric acid-treated, essentially paraffinic hydrocarbon fraction boiling between 190° and 200° C. This mixture was contacted with ethylene at 1000–600 p.s.i. and at 240° C. for 4 hours. No solid polymer yas produced but 318 ml. of viscous polyethylene oil was formed.

*Example 5*

Example 4 was repeated with polymerization temperature decreased to 150° C. Reaction was carried out at 1600–600 p.s.i. for 7.5 hours. The polyethylene formed was isolated by filtration and purified by filtration under pressure of a solution of the polymer in mineral spirits. The yield of polyethylene was 112 g.; melt index, 0.038.

*Example 6*

A 2-liter stirred autoclave was charged with 4.0 g. (0.148 atom) of aluminum powder, 9.8 g. (0.074 mole) of aluminum chloride, 10 g. of 1% $V_2O_5$ on 90:10 silica-alumina catalyst, and 800 ml. of iso-octane. The catalyst mixture was stirred and heated to 95° C. When this temperature was reached, propylene was pumped into the autoclave until the pressure amounted to 550 p.s.i. Reaction was continued at 95° C. for 16 hours.

At the end of the reaction period, the crude product was cooled and the solid polymer collected by filtration. The crude solid polymer was redissolved in hot xylene, filtered under nitrogen pressure to remove catalyst, and finally reprecipitated by addition of methanol. The solid polymer was collected and dried in vacuo, weight, 44 g.

In order to determine the crystallinity of the polymer, the sample was extracted in a Soxhlet apparatus for 16 hours with acetone, diisopropyl ether, and heptane. Each extracting solvent was evaporated to dryness to determine the weight of the polymer extracted. Results were as follows:

|                         | Percent |
|-------------------------|---------|
| Acetone soluble         | 15      |
| Diisopropyl ether soluble | 25    |
| Heptane soluble         | 18      |
| Residue                 | 42      |

The residue amounted to 42% of the original polymer and was essentially 100% isotactic crystalline polypropylene.

We claim:

1. The process for producing high molecular weight crystalline polyethylene which comprises contacting ethylene with a catalyst consisting essentially of vanadium oxide, aluminum and aluminum chloride in the presence of a normally liquid saturated aliphatic hydrocarbon at a temperature within the range of 100 to 260° C.

2. The process for producing high molecular weight crystalline polyethylene which comprises contacting ethylene with a catalyst consisting essentially of vanadium oxide deposited on an aluminum oxide support and aluminum and aluminum chloride in the presence of a normally liquid saturated aliphatic hydrocarbon at a temperature within the range of 100 to 260° C.

3. The process for producing high molecular weight crystalline polyethylene which comprises contacting ethylene with a catalyst consisting essentially of vanadium oxide deposited on an aluminum oxide support, aluminum and aluminum chloride at a temperature within the range of 100–260° C. and a pressure within the range of 200–2000 p.s.i. in the presence of a normally liquid saturated aliphatic hydrocarbon.

4. The process which comprises contacting ethylene with a catalyst comprising vanadium oxide deposited on an aluminum oxide support and aluminum and aluminum chloride in the presence of a normally liquid saturated aliphatic hydrocarbon at a temperature within the range of 100–260° C. and a pressure within the range of 200–2000 p.s.i., the concentration of vanadium oxide in the reaction mixture being within the range of 0.004 to 1.5% by weight, the mole ratio of aluminum to vanadium oxide being within the range of 1:1 to 200:1, said catalyst containing from 0.5 to 2 moles of aluminum chloride per atom of aluminum to produce high molecular weight crystalline polyethylene.

5. As a composition of matter, a catalyst for producing high molecular weight crystalline polyethylene consisting essentially of vanadium oxide, aluminum and aluminum chloride.

6. As a composition of matter, a catalyst for producing high molecular weight crystalline polyethylene consisting essentially of vanadium oxide deposited on an aluminum oxide support, aluminum and aluminum chloride.

7. As a composition of matter, a catalyst for producing high molecular weight crystalline polyethylene consisting essentially of vanadium oxide deposited on an aluminum oxide support, aluminum and aluminum chloride, the mole ratio of aluminum to vanadium oxide being within the range of 1:1 to 200:1 and said catalyst containing from 0.5 to 2 moles of aluminum chloride per atom of aluminum.

8. The process for producing hydrocarbon polymers which comprises contacting an α-monoolefinic aliphatic hydrocarbon containing from 2–10 carbon atoms with a catalyst consisting essentially of vanadium oxide, aluminum and aluminum chloride, in the presence of an inert, normally liquid, hydrocarbon solvent at a temperature within the range of 100–260° C.

9. The process for producing high molecular weight crystalline polypropylene which comprises contacting propylene with a catalyst consisting essentially of vanadium oxide, aluminum and aluminum chloride in the presence of a normally liquid, saturated aliphatic hydrocarbon at a temperature within the range of 100–260° C.

References Cited in the file of this patent

UNITED STATES PATENTS

| 2,279,199 | Huppke | Apr. 7, 1942 |
| 2,726,234 | Field et al. | Dec. 6, 1955 |
| 2,824,089 | Peters | Feb. 18, 1958 |
| 2,846,427 | Findlay | Aug. 5, 1958 |

FOREIGN PATENTS

| 785,314 | Great Britain | Oct. 23, 1957 |
| 534,792 | Belgium | May 2, 1955 |
| 874,215 | Germany | Apr. 20, 1953 |